United States Patent Office 3,475,997
Patented Nov. 4, 1969

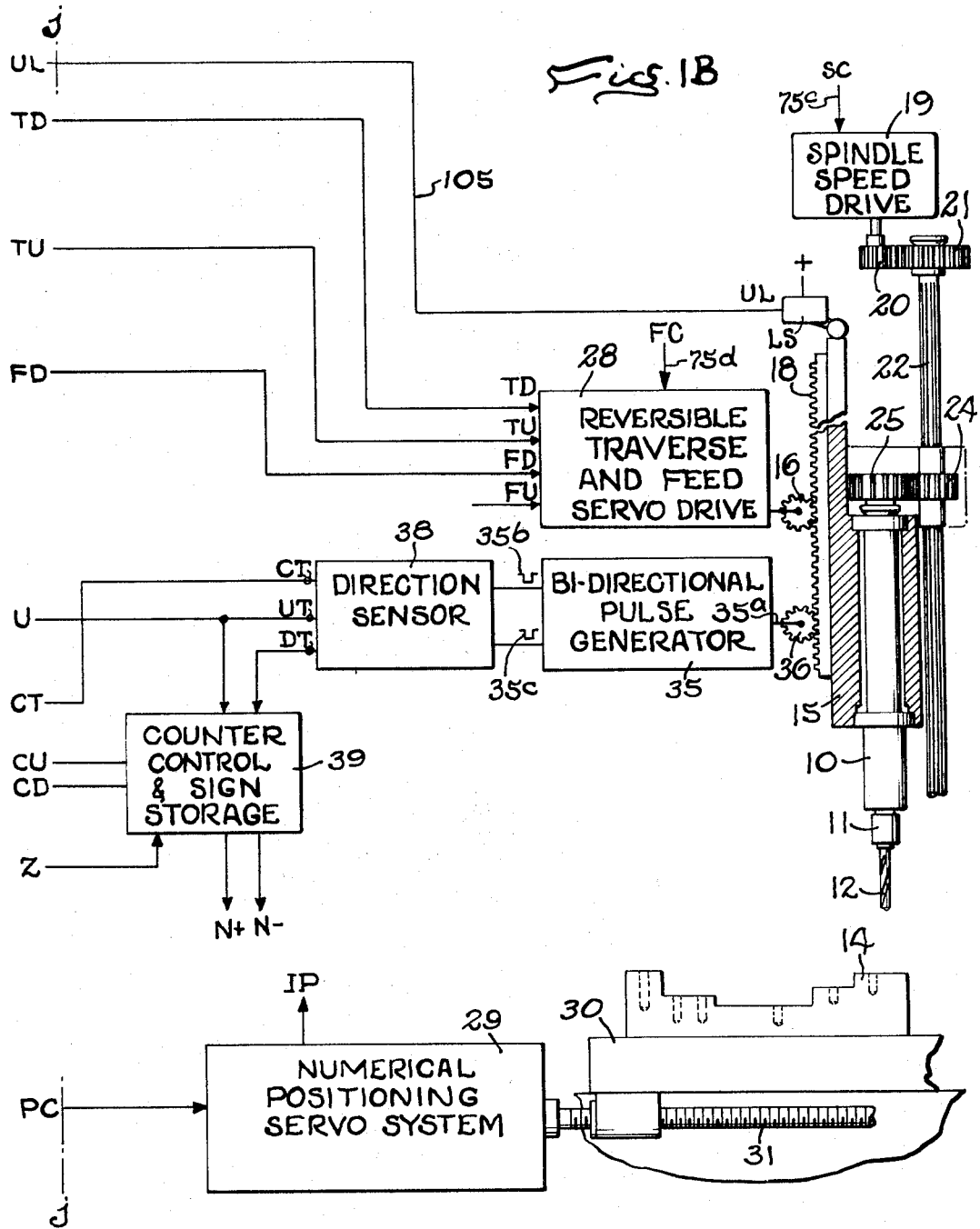

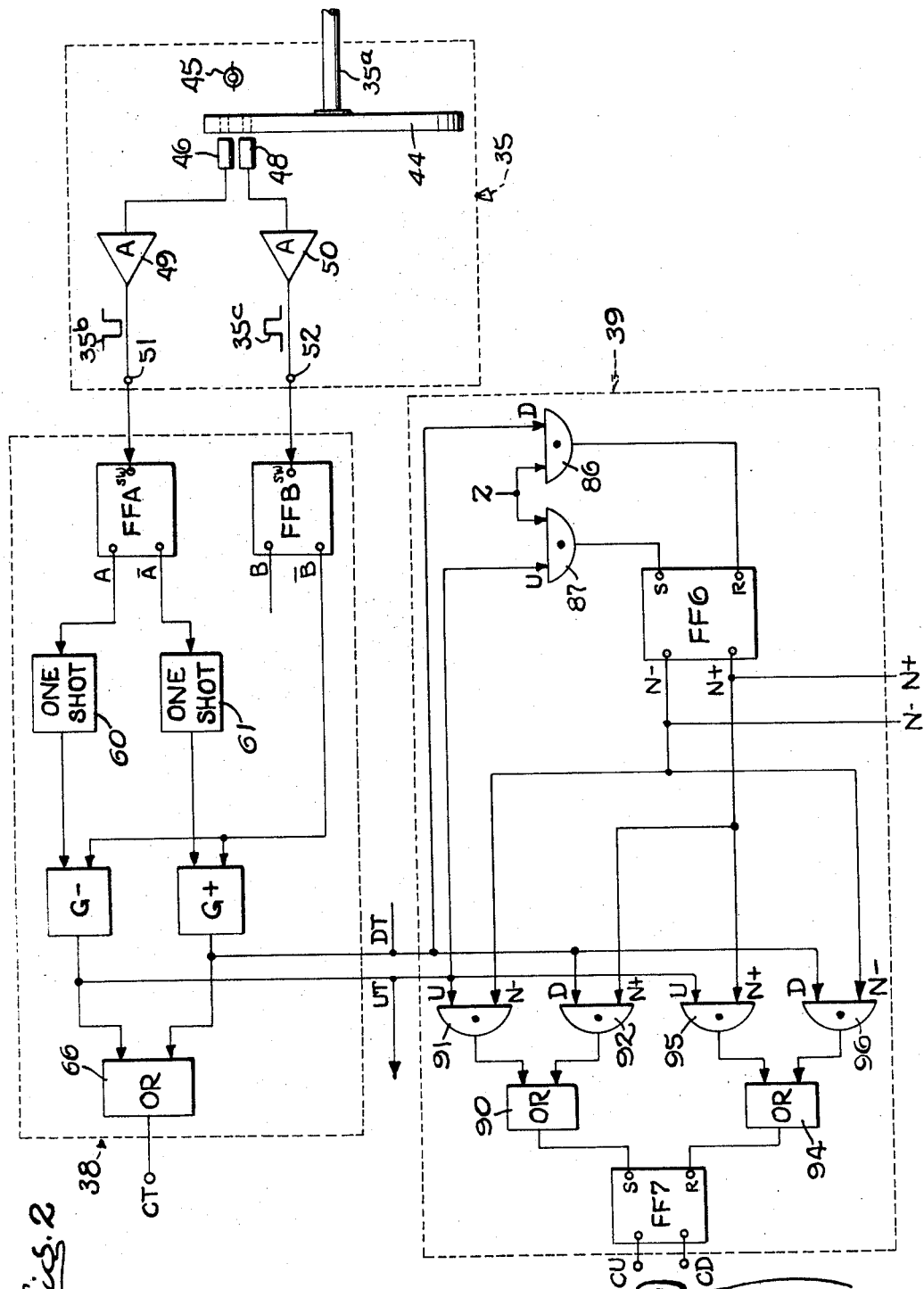

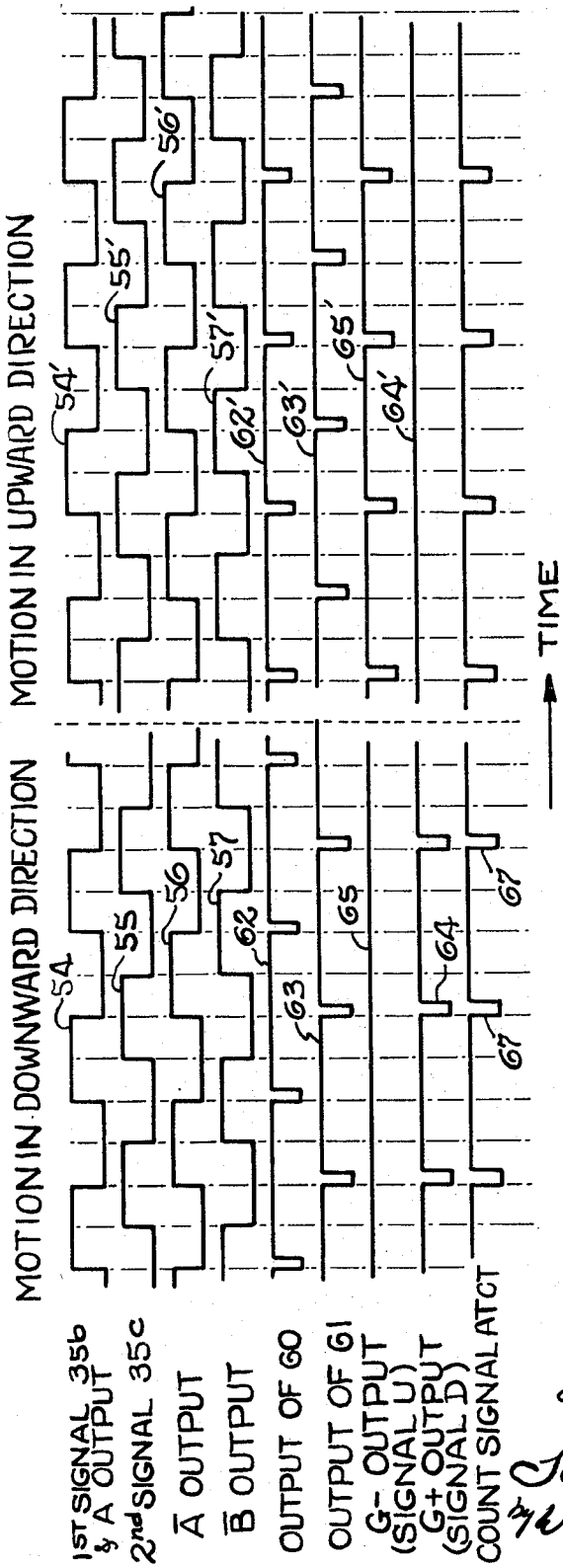

3,475,997
METHOD AND APPARATUS FOR CONTROLLING MOTIONS OF A DRILLING CUTTER OR THE LIKE
Jack A. Wohlfeil, Fond du Lac, Wis., assignor to Giddings & Lewis, Inc., Fond du Lac, Wis., a corporation of Wisconsin
Filed Mar. 10, 1967, Ser. No. 622,325
Int. Cl. B23b 47/24; H02p 7/52, 7/18
U.S. Cl. 77—32.7                    13 Claims

ABSTRACT OF THE DISCLOSURE

In the control of a drilling machine or the like, the drilling cutter is traversed toward a workpiece and its motion converted to a slower feed rate at the instant the cutter engages the workpiece. Such engagement is signaled by producing first and second electrical signals whenever the cutter is moving respectively toward or away from the workpiece, and detecting the momentary appearance of the second signal which results when the cutter strikes and rebounds slightly from the workpiece. When such detection occurs, the velocity of the cutter is reduced to feed rate, and measurement of the displacement of the cutter is begun. The measured displacement is compared to a predetermined or desired and commanded penetration distance, and when the former becomes equal to the latter, the cutter is retracted. Advantageously, the displacement of the cutter is measured by a reversible counted which responds to pulses generated as an incident to movement of the cutter; and the abovementioned first and second signals are those which are employed to control the direction of counting. The method may be practiced by employing widely different forms of apparatus, but one especially advantageous form is disclosed.

---

Figure 1A:
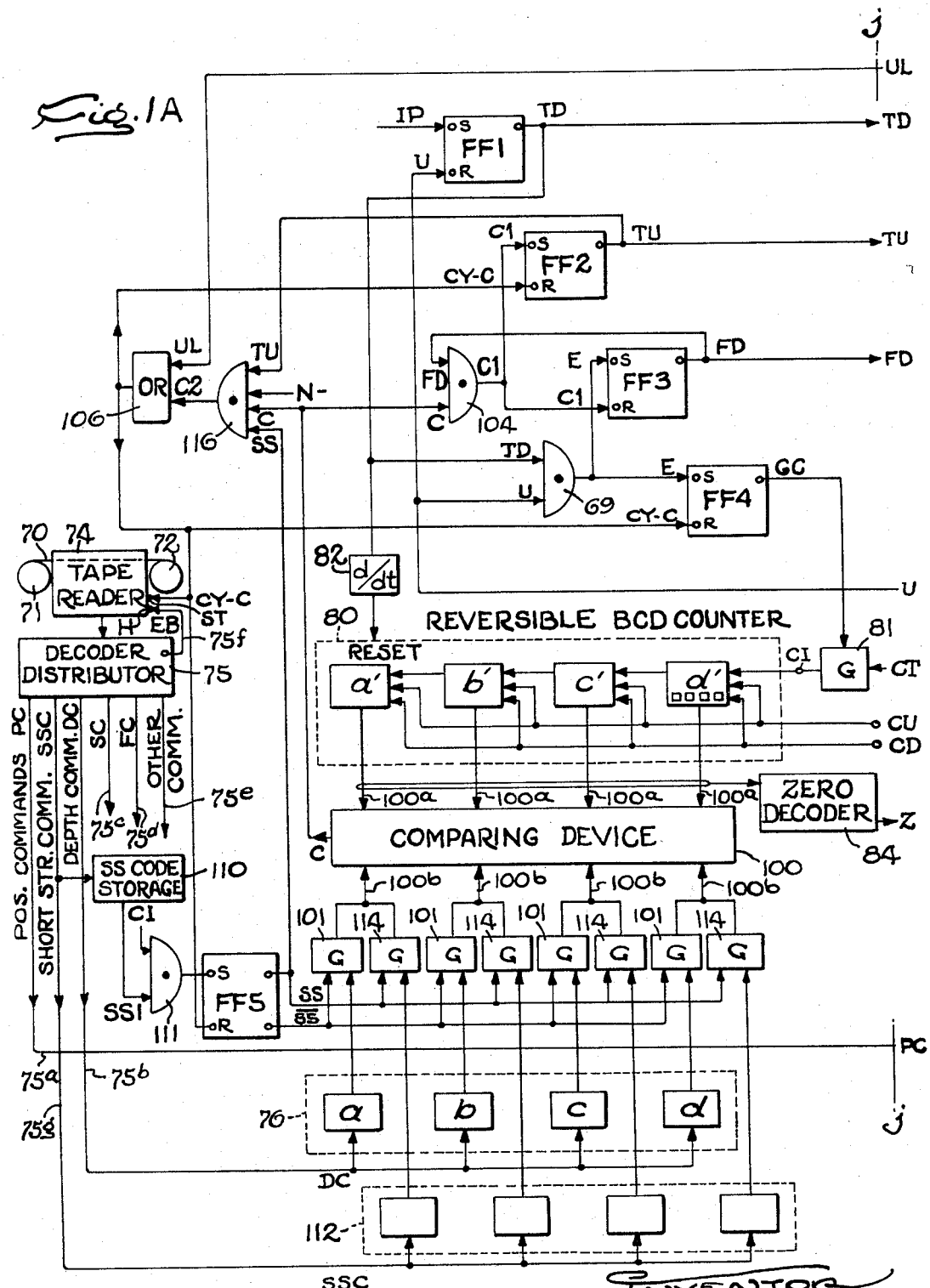

The present invention relates in general to methods and apparatus for the control of machine tools, and in particular to the control of reciprocable cutters, which are to penetrate a workpiece to predetermined depths at a succession of locations. Although the invention will find advantageous use in a wide variety of applications, it is particularly well suited for controlling the operation of a vertical drilling machine and it will be described by way of example in that environment.

It is the general aim of the invention to provide a very simple yet reliable method and apparatus for rapidly traversing a cutter until it engages a workpiece, and after such engagement feeding the cutter until it penetrates the workpiece to a desired depth.

It is an important object of the invention to provide a new and advantageous method and apparatus for signaling the instant at which a moving element engages an obstacle in its path.

Another object is to provide a method and apparatus for not only signaling the initial engagement of an advancing cutter with a workpiece but also for measuring the displacement of the cutter from the point at which such engagement occurs, certain components being usable in part to accomplish both the signaling and the measuring.

An additional object is to provide a method and apparatus for "short stroking" a cutter in a manner such that, after each penetration of the work, the cutter is retracted to clear the workpiece surface by a predetermined distance prior to the next penetration step, yet wherein the engagement of the cutter with the workpiece surface is signaled by the equipment which would otherwise be required simply to measure cutter displacements.

These and other objects and advantages of the invention will become apparent as the following description is considered in conjunction with the accompanying drawings, wherein:

FIGURES 1A and 1B, when joined along the indicated junction line j—j, form a diagrammatic illustration of an exemplary machine tool and control system which may be used in practicing the invention;

FIG. 2 is a detailed, diagrammatic, block-and-line illustration of certain components which are represented in FIG. 1B by more generalized blocks; and FIG. 3 is a series of waveforms plotted against time and representing the relationships of certain signals during the operation of the pulse generator and direction sensor shown in FIG. 2.

While the invention has been shown and will be described in some detail with reference to specific and exemplary procedures, and with reference to a particular embodiment of apparatus, there is no intention to limit the invention to such details. On the contrary, it is intended here to cover all alternatives, modifications and equivalents which fall within the spirit and scope of the invention as expressed in the appended claims.

TYPICAL ENVIRONMENT IN THE PRACTICE OF THE INVENTION

As a typical element movable in opposite directions, FIG. 1B shows in diagrammatic form the spindle 10 a vertical drilling machine, such spindle having a chuck 11 at its lower end carrying a cutter or drilling bit 12 which is adapted to penetrate and drill holes in a workpiece 14. To move the bit 12 and the workpiece relatively toward or away from one another, the spindle 10 is journaled by suitable thrust bearings in a quill 15 movable in first or second directions, i.e., downwardly or upwardly. The quill may be driven in either such direction by rotation of a pinion 16 engaged with the teeth of a rack 18 formed on or rigidly fixed to the quill body. As the quill, together with the spindle and cutter rotatably carried thereby, is moved vertically, the spindle and cutter are continuously rotated by a spindle speed drive 19 having its output shaft coupled via gears 20, 21 to a splined shaft 22. A first gear 24 vertically slidable along the splined shaft is constantly meshed with a drive pinion 25 fast on the spindle, so that regardless of the vertical movement or position of the spindle, it is rotationally driven to rotate the bit 12.

The rotational direction and speed of the spindle and cutter are controlled by the spindle speed drive 19, various forms of which are known to those skilled in the art and the details of which thus need not be here described. In the preferred arrangement, the spindle speed drive 19 responds to speed command signals SC to rotate the spindle and cutter at any desired speed and in the desired direction.

In a similar manner, the direction and rate of vertical movement of the quill 15 are controlled by a reversible traverse and feed servo drive 28 having its output shaft coupled to the pinion 16 and serving as a means to drive the cutter and spindle either upwardly or downwardly. The servo drive here shown only in block representation may take any one of a variety of forms well known in the art, and its details are not critical to the practice of the present invention. For convenience of explanation, the servo drive 28 may be considered as responsive to four possible input signals TD, TU, FD, and FU for respectively causing "traverse down," "traverse up," "feed down," or "feed up" motion of the quill, spindle and cutter. The term "traverse" is here used conventionally as denoting a rapid traverse or high velocity which is usually always the same, maximum velocity of which the drive 28 is capable of producing. The term "feed" is here used in a conventional sense to designate a velocity somewhat less than the traverse velocity, and the specific value of which is determined by feed command signals FC supplied to and stored in the servo drive system 28. Thus, it may be understood without further elaboration that the servo drive 28 serves (a) as a means for moving the element or cutter 12 downwardly toward the workpiece 14 at a high or traverse velocity in response to the input signal TD, (b) as a means for moving the cutter 12 upwardly and away from the workpiece 14 at a high or traverse velocity in response to the signal TU, (c) as a means for moving the cutter 12 downwardly toward or into the workpiece at a low or feed velocity in response to the signals FD, and (d) as a means for moving the cutter 12 upwardly out of and away from the workpiece 14 at a feed velocity in response to the input signal FU.

In the present instance, and as will be confirmed hereinafter, the signals TD, TU and FD may be considered as binary signals, each of which may have either a "1" or "0" level, and only one of which is at an effective or "1" level at any given time so as to produce the corresponding direction and velocity of motion for the quill 15. If all of these control signals supplied to the servo drive 28 are at their binary "0" levels, then the quill will be held stationary.

Although not essential to the practice of the invention, the drilling machine here partially shown is preferably operated to drill a succession of holes at different locations in the workpiece under "numerical control" of information contained on a digital record such as a punched tape. Each "block" of information on the punched tape may designate the location of a hole to be drilled and the depth of that particular hole. Prior to each cycle of lowering and retracting the cutter 12, the workpiece 14 will be automatically moved horizontally, for example, along X and Y axes, beneath the roating spindle by a numerical positioning servo system 29 which receives positioning command signals PC derived from reading one block of data from the punched tape. As shown in FIG. 1B, the workpiece 14 is clamped or locked fast on a table 30 slidable along ways (not shown) in X and Y directions in response to rotation of X and Y lead screws 31 (only one being shown) which are rotationally driven by the servo system 29. When the servo system has brought the table and workpiece to a halt in the commanded position, so that lowering of the cutter 12 will result in drilling a hole in the desired location, the servo system produces an "in position" signal IP.

In the operation of an automatic, numerically controlled drilling machine, it is desirable to make each drilling cycle as short as possible so that the machine will function efficiently in drilling a large number of successive holes in the shortest feasible time. If the cutter is traversed downwardly only to some predetermined point well above the workpiece surface, and then fed slowly while "cutting air" before it engages the workpiece, the drilling cycle will be lengthened and the efficiency of the machine reduced. On the other hand, in most all drilling machine operations, the materials of the cutter and the workpiece simply will not withstand the heat and stresses which would result if an attempt were made to drill a hole while the cutter is being advanced at the traverse rate. Thus, when the actual drilling begins, the cutter is advanced at a slower feed rate which is selected with reference to the materials of the cutter and workpiece to avoid damage to either. For these reasons, it has been the prior practice to traverse the cutter toward the workpiece until the former strikes the latter, and then to convert the motion to a feed velocity while the hole is being drilled. One prior arrangement for accomplishing this is disclosed in Reichert et al. United States Patent 3,151,505, wherein a hydraulic counterbalance and traversing means are employed, and the increase in pressure within the hydraulic system resulting from engagement of the cutter with the workpiece is employed to signal that the two have come into contact. The use of hydraulic pressure increase to signal engagement of the cutter and workpiece is not always as fast in its response as may be necessary to prevent damage to the cutter; and it cannot be employed by machines which do not have a hydraulic counterbalance or traversing system for the machine spindle, as disclosed in the Reichert et al. patent.

SIGNALING OF ENGAGEMENT

In accordance with the present invention, a different and advantageous method is employed to signal almost instantaneously when a movable element (such as the cutter 12) engages an obstacle (such as the workpiece 14) in its path. Such method involves creating first or second electrical signals when the cutter 12 is moving in first or second directions, respectively; and detecting the momentary appearance of the second signal which results when the cutter, traveling in the first direction, strikes and rebounds slightly from the workpiece in the second direction. In response to such detection, the movement of the cutter is converted from traverse to feed so that the cutter will thereafter penetrate the workpiece at a feed rate.

A. Generating the first and second direction signals

As an exemplary way of generating the first and second signals, a bidirectional pulse generator 35 (FIG. 1B) is coupled to be driven in one sense or the other when the spindle is moving upwardly or downwardly. As here shown, a precision pinion 36 meshed with the rack 18 drives the input shaft 35a of the pulse generator, and the latter produces two output signals 35b, 35c in the form of recurring square waves. Each of these output signals contains one complete cycle for each basic unit distance which the quill 15 and the cutter 12 travel, e.g., one cycle for each .001″ of motion, irrespective of whether that motion is in an upward or downward direction. However, the signal 35b either leads or lags the signal 35c in phase when the cutter is moving downwardly or upwardly, respectively. These output signals are supplied to a direction sensor 38 which in turn produces one pulse on its count output terminal CT for each increment of cutter motion, and which further produces first or second signals D or U on its output terminals DT or UT when the cutter motion is in a downward or upward direction, respectively.

The pulse generator 35 and the direction sensor 38, together with an associated counter control and sign storage device 39 are used for the purpose of actuating a counter which measures off and digitally signals displacements of the cutter, as hereinafter described. But the pulse generator 35 and the direction sensor 38 also are employed to produce the "engagement" signal, and these latter devices thus serve two important functions.

FIGS. 2 and 3 illustrate in more detail the organization and operation of the generator 35 and sensor 38. While the pulse generator 35 may take any of a variety of suitable forms, that shown diagrammatically in FIG. 2 is one currently being sold under the trade name "Rotopulser" by the Dynapar Corporation of Skokie, Ill. Its input shaft 35a (driven by the pinion 36) carries a disk 44 having spaced apertures or notches in its periphery. Light from a lamp 45 disposed on one side of the disk is alternately transmitted to or blocked from a pair of photocells 46, 48 coupled through amplifiers 49, 50 to output terminals 51, 52. Briefly stated, as the disk 44 rotates, the first signal 35b at the output terminal 51 varies as a square wave having one cycle for each angular increment of disk motion corresponding to .001″ of movement by the quill 15. The second output signal 35c on the output terminal 52 varies in the same manner. However, the first signal either leads or lags the second signal by 90° in phase when the disk is rotating in a clockwise or counterclockwise direction, respectively as a result of the quill 15 and the cutter 12 moving in a downward or upward direction. Thus, if the cutter motion is downward, the first and second output signals 35b and 35c have the square waveforms and phase relationship shown at 54 and 55 in the left portion of FIG. 3; and if the motion is in an upward direction, these first and second output signals have the waveshapes and relationship shown at 54' and 55' in the right portion of FIG. 3.

These first and second signals 35b, 35c are applied to the "toggle" or "switch" input terminals sw of first and second follower flip-flops $FF_A$ and $FF_B$. The latter are constructed such that they switch to the "1" state in response to a high input potential and to their "0" states in response to a low input potential. Thus, the flip-flop output terminals A and B in FIG. 2 have signal variations thereon which are the same in form as those illustrated at 54, 54' and 55, 55' in FIG. 3. The output terminals $\bar{A}$ and $\bar{B}$ of these two flip-flops have potentials which vary complementally and thus which have the forms illustrated at 56 and 57 in the left portion of FIG. 3 when the cutter motion is in a downward direction; but they have the waveforms and phase relationships shown at 56' and 57' in the left portion of FIG. 3 when motion of the cutter is in an upward direction.

To sense and electrically signal whether the cutter 12 is moving in a downward or upward direction, the A and $\bar{A}$ output terminals of the flip-flop $FF_A$ are supplied respectively to trigger two monostable or "one shot" multivibrators 60 and 61. The latter trigger and produce a short negative-going output pulse (signifying a binary "1" level) each time that their input signals have a negative-going transition. Thus, the pulse outputs of the one shot multivibrators 60 and 61 have the form illustrated in FIG. 3 at 62 and 63, respectively, when the sensed motion is in a downward direction; and they have the form illustrated at 62' and 63' (right portion of FIG. 3) when motion is in an upward direction. The outputs of the one shot devices 60 and 61 are supplied as inputs to two respective gates G— and G+, while both of the latter are controlled by receiving the signal from the $\bar{B}$ output terminal of the flip-flop $FF_B$.

From FIGS. 2 and 3, it will be apparent that if the spindle 10 and the cutter 12 are moving in a downward direction (see left portion of FIG. 3), then the gate G+ will receive a low level or binary "1" signal from the $\bar{B}$ terminal at those instants when the output pulses are produced by the one shot device 61. As a result, pulses as shown at 64 will be passed from the gate G+ to the output terminal DT, with one pulse occurring as a result of each .001" of movement by the cutter. The gate G—, on the other hand, will pass no pulses as indicated at 65 in FIG. 3.

In contrast, when the quill 15 and the cutter 12 are being translated upwardly so that the output signal 35b on terminal 51 lags the output signal 35c on terminal 52 as shown at 54' and 55' in FIG. 3, the gate G— will receive a low level or binary "1" input from the $\bar{B}$ terminal at those instants when the one shot device 61 produces the negative-going pulses 62'. Accordingly, the output of the gate G— is a series of pulses (shown at 65' in FIG. 3) appearing on the upward indication output terminal UT. Under these conditions, there is no output from the gate G+, as indicated at 64' in FIG. 3.

The outputs from both of the gates G+ and G— are passed through an OR circuit 66 to the count terminal CT of the direction sensor 38. Since only one or the other of the gates G+ and G— produces a series of output pulses when the cutter is moving downwardly or upwardly, respectively, that same series of pulses will appear (as shown at 67 in FIG. 3) on the count terminal CT. It will be observed from FIG. 3 that there is one such output pulse 67 passed to the terminal CT for each cycle of the input wave 54 or 54'. In other words, for each motion increment of .001" of the quill 15 and the cutter 12 in either direction, one and only one pulse 67 is passed to the count terminal CT. These pulses may be counted, as hereinafter described, in order to measure the displacement of the cutter 12.

B. Detecting momentary appearance of one signal

It has been discovered that even in precision machine tools having the finest of feed drives, when a cutter is being traversed toward a workpiece and strikes the latter, there will be a small but definitely perceptible "rebound" of the cutter, spindle, and quill in the direction opposite to that in which they were originally traveling. Indeed, even with a "stiff" drive means for translating any movable element, the latter will "rebound" slightly, and thus move at least for an instant and through a short distance in the opposite direction, when it engages an obstacle in its path.

This phenomenon is turned to good use in the present invention. Since first or second signals (here, the signals D or U) are produced when the cutter is moving respectively in a first or second direction (downwardly or upwardly), the momentary appearance of that signal corresponding to the direction which is opposite to that in which the cutter is being driven is detected and utilized as a signal indicating that the cutter has engaged the workpiece.

In the arrangement here illustrated, the engagement signal is produced by coupling the second signal U to one input of an AND gate 69 which receives on its other input the control signal TD. If the signal TD is at a binary "1" level (indicating that the cutter 12 is being traversed downwardly toward the workpiece 14), the cutter upon engaging the work surface will rebound through a slight distance of one or two thousandths of an inch. Such rebounding constitutes movement of the cutter 12 and the quill 15 in an upward direction, and this will produce on or two pulses in the signal U on the upward motion terminal UT. In response to this momentary appearance of the second signal constituted by the pulses appearing on the terminal U, the gate 69 will produce a momentary output signal or pulse E indicative of the fact that the cutter 12 has engaged the surface of the workpiece.

Reviewing briefly, the present invention contemplates that the engagement of a movable element such as the cutter 12 with an obstacle such as the workpiece 14 will be signaled almost instantaneously by generating first and second signals (e.g., the pulse signals D or U) when the element is moving in first or second directions (downwardly or upwardly). As the element is moving in one direction (downwardly) and strikes an obstacle so as to rebound slightly therefrom, the second signal will momentarily appear, i.e., one or more pulses U will appear on the terminal UT. This momentary appearance is detected in the present instance by the gate 69 which will transmit the momentary second signal only if the movable element or cutter 12 is at that time traversing downwardly. But if the gate 69 produces an output signal E, then this is a positive indication that the cutter 12 has come into contact with the surface of the workpiece while traversing downwardly.

THE METHOD OF PRODUCING NORMAL DRILLING CYCLES

Now that the method and exemplary apparatus for creating an engagement signal are understood, it will be appropriate to describe the procedural steps and the apparatus for controlling the machine tool to produce successive cycles for drilling holes of desired depths and at desired locations in a workpiece. It will be assumed merely for the sake of example and completeness that the machine tool is to operate automatically under numerical control according to information contained on a digital record. Command information for each hole to be drilled is contained within one "block" of a punched tape 70 which is threaded to pass from a supply reel 71 to a take-up reel 72 through a tape reader 74 (FIG. 1A). When the tape reader is started in response to a momentary signal applied to its start terminal ST, it steps the tape to read successive holes therein and supplies successive correponding output signals to a decoder-distributor 75. The X and Y axis position commands within a block of the tape appear as signals PC on an output line 75a of the decoder, and these are routed to the positioning servo system 29 so that the table 30 begins moving the workpiece toward a desired, commanded position beneath the retracted cutter 12.

Another group of signals resulting from the reading of a block on the tape 70 appear on an output line 75b of the decoder, and these signals DC define the desired cutter penetration, i.e., the depth of the hole which is to be drilled, measured from the surface of the work at the location of that particular hole. Because the workpiece may have surface portions at different elevations, and the drill bit 12 may have different lengths, it is not feasible or practical to designate the location of the bottom of each desired hole by a command representing the absolute vertical position of the spindle 10. The depth command signals DC which appear on the decoder output line 75b thus numerically represent, and preferably in binary coded decimal notation, the actual depth of the hole to be drilled, regardless of the elevation of the work surface at the desired hole location. These depth command signals are routed via the output line 75b to the several inputs a storage register 76 having four decade portions each of which is thus conditioned to store and signal on its output lines one digit of a four digit decimal number a.bcd representing the desired hole depth. The value of each digit is preferably signaled in binary coded decimal notation, so that there are actually four output lines (here shown as one) for each decade portion in the storage register 76. Merely by way of example, if the commanded hole depth is 2.563", the a storage decade will signal decimal value "2," the b storage decade will signal the decimal value "5," the c storage decade will signal the decimal value "6," and the d storage decade will signal the decimal value "3."

As the tape reader 74 continues to read rows in a given block of the punched tape, speed command signals SC may appear on the decoder output line 75c, and these are routed for storage and processing in the spindle speed drive 19 in order to cause the spindle 10 to be driven at a particular desired rotational speed. Similarly, a block on the punched tape 70 may contain feed command information, and as this is read by the tape reader 74, feed command signals FC will appear on the decoder output line 75d. These latter signals are routed for storage and utilization in the traverse and feed servo drive 28, and they serve to make the value of the feed velocity which results when the drive 28 is conditioned for feeding operation have a desired, commanded value. In like manner, other command signals contained within a block on the punched tape 70 may result in signals on additional decoder output lines such as that shown at 75e, and these additional command signals may be utilized in manners and for purposes which need not be described here.

After the tape reader 74 has been started and has read one complete block of data, it will sense an "end of block" code on the punched tape and the decoder will produce a momentary signal EB on its output line 75f. This momentary signal EB is applied to a "hold" terminal H of the tape reader, and causes the latter to stop the advancement and reading of the punched tape 70. The tape reader will be restarted to read the next block when a momentary signal is next applied to its start terminal ST.

After a block of data has been read from the punched tape 70 and the position command signals PC have caused the positioning servo system 29 to begin moving the workpiece to the newly commanded position, the system 29 will produce an "in position" signal IP when the table 30 and the workpiece 14 are brought to a halt in the desired location.

In the practice of the present method, the cutter is first moved at a traverse rate from a retracted position downwardly toward the workpiece. In the present instance, this is accomplished in response to the signal IP which is routed to the "set" input terminal S of a flip-flop FF1 and causes its output signal which is here the TD control signal, to switch to a binary "1" level. In consequence, the servo drive 28 is conditioned to drive the quill 15, the spindle 10 and the cutter 12 downardly at a traverse rate.

Next, the engagement of the cutter 12 with the workpiece is instantaneously signaled in the manner described above. The pulse generator 35 and the direction sensor 38 are employed to produce first and second signals D and U when the cutter 12 is moving in first or second (downward or upward) directions toward or away from the workpiece. After the cutter 12 begins traversing downwardly, the signal D in the form of successive pulses will be produced by the direction sensor 38, but no U signal will exist. But when the cutter strikes the workpiece and rebounds slightly in an upward direction, the signal U will momentarily appear, i.e., there will be at least one or two pulses on the terminal UT. At least one of these pulses will pass through the gate 69 because the other input signal TD for that gate is now at a binary "1" level, indicating that the servo drive 28 is conditioned to drive the cutter downwardly at a traverse rate. The output signal E in the form of a momentary pulse from the gate 69 thus results from the detection of the momentary appearance of the U signal.

In response to such detection, the downward movement of the cutter is continued, but such movement is converted from the traverse to a feed velocity. For this purpose, the signal U is supplied to the reset terminal R of the flip-flop FF1, so that the signal TD is restored to a binary "0" level; and the engagement signal E (which appears just before flip-flop FF1 resets) is routed to the set input of a flip-flop FF3 whose output signal FD is thus switched to a binary "1" level. As a result, the servo drive 28 now drives the cutter 12 downwardly at a slower feed rate. The actual penetration of the cutter into the workpiece, and the drilling of the desired hole is thus commenced at a desired feed rate.

In the present method, however, measurement of the displacement of the cutter is also begun in response to the engagement signal E which is produced as a result of the momentary appearance of the signal U.

The procedure and the apparatus for measuring cutter displacement may take a variety of forms, but in the present instance a reversible counter 80 is employed. As shown in FIG. 1A, this counter comprises four decade stages connected in tandem, each such stage having four bistate devices or flip-flops interconnected by gates so as to signal in binary coded decimal notation on its four output lines (shown as one line) any decimal value between 0 and 9 as ten successive input pulses are supplied thereto. Carry output pulses from each stage are supplied as input pulses to the decade stage of the next higher order. Such reversible counters are well known in the art, and need not be treated in detail here. It will be sufficient to note that the counter 80 will count up, i.e., increase the number stored therein in response to each pulse supplied to its count input terminal CI if a binary "1" signal is supplied to its "count up" control terminal CU. On the other hand, if a binary "1" signal is applied to its "count down" control terminal CD, each input pulse received on the terminal CI will reduce by one unit the number held in and signaled by the counter.

To make the counter 80 measure and signal the displacement of the cutter 12 only after the latter has contacted the workpiece, the pulses which appear at the terminal CT of the direction sensor 38 are coupled through a gate 81 to the input terminal CI. The gate 81 is normally held close by virtue of a gate control signal GC, produced by a flip-flop FF4, normally residing at a binary "0" level. Moreover, the counter 80 is reset to its zero state prior to engagement of the cutter with the workpiece, and this is accomplished by coupling the signal TD through a differentiator 82 to the reset terminal of the counter. Thus, when the signal TD first switches to a binary "1" level all stages of the counter 80 are reset, and the counter signals a number $a' \cdot b'c'd'$ which is 0.000.

The sense of counting in response to pulses supplied to the count input terminal CI is controlled by the counter control and sign storage unit 39 which produces either a CU or a CD signal, and which also signals the sign of the number held in the counter.

For this later purpose, a flip-flop FF6 (FIG. 2) is employed to produce complemental sign-representing signals N— or N+ signals at a binary "1" level when it is respectively in its set or reset state. The signaled counter number sign is changed when the number held in the counter is zero and the direction sensor 38 signals that the cutter motion is downward (positive) or upward (negative). To control the flip-flop FF6, a zero decoder 84 is coupled to the outputs of all stages in the counter 80 as shown in FIG. 1A, and the decoder produces an output signal Z at a binary "1" level only when the number held in the counter is zero, i.e., 0.000. This Z signal forms one input to each of two gates 86, 87 (FIG. 2) which respectively receive the first and second signal pulses D and U, and whose outputs are connected respectively to the reset and set terminals of the flip-flop FF6. Therefore, when the cutter is moving downwardly or upwardly and either the pulses D or U are being generated, the flip-flop will be reset or set, respectively, if and when the number held in the counter 80 is zero. Correspondingly, the sign of the number held in the counter will thereafter be signaled as positive or negative ,because the signal N+ or N— will reside at a binary "1" level.

To control the sense of counting, a flip-flop FF7 (FIG. 2) is employed to produce the complemental signals CU and CD when it is in its set or reset states. If the cutter tip is located on the "positive" side or below the reference point (work surface), the counter is made to count up or down, respectively, as the cutter moves downwardly or upwardly. Conversely, if the cutter tip is located on the "negative" side of or above the work surface, the counter is caused to count up or count down, respectively, as the cutter moves upwardly or downwardly. To bring this about, the set terminal of the flip-flop FF7 is connected to receive output pulses from an OR circuit 90 receiving its inputs from two gates 91, 92. These gates 91 and 92 are connected to receive as controlling inputs the signals N— and N+, respectively, and to receive the U and D pulse signals, respectively. Thus, when the counter number is positive in sign and the cutter is moving downwardly, the D pulses will pass through the gate 92 and the OR circuit 90 to set the flip-flop FF7 and make the control signal CU reside at a binary "1" level. But if the counter number is negative, and the cutter is moving upwardly, signals will be transmited through the gate 91 and the OR circuit 90 to set the flip-flop FF7. On the other hand, the reset terminal of the flip-flop FF7 receives output signals from an OR circuit 94 whose two inputs are coupled to gates 95 and 96. These gates are respectively controlled by the N+ and N— signals, and respectively receive the U and the D pulse signals. Thus, if the sign of the counter number is positive and the cutter 12 is moving upwardly, or if the sign of the counter number is negative, and the cutter is moving downwardly, then the flip-flop FF7 will be reset to make the signal CD reside at a binary "1" level, thereby to cause the counter 80 to count down in response to pulses received on its input terminal CI.

Returning now to the sequence of operational steps, it will be recalled that when the flip-flop FF1 has been set and the cutter 12 is traversing downwardly, the counter 80 has been reset to its zero count state and the gate 81 is closed because the flip-flop FF4 is initially reset and the control signal GC is at a binary "0" level. Thus, the counter simply remains in its zero state because no input pulses can pass through the gate 81 to the terminal CI. However, as the cutter is traversing downwardly, one pulse for each .001″ of movement will appear on the terminal CT, and similar pulses D will appear on the direction sensor terminal DT. Thus, the flip-flop FF6 (FIG. 2) will be in its reset state to signal a positive sign for the number in the counter, and the flip-flop FF7 will be in its set state, making the signal CU a binary "1" and conditioning the counter to count up when input pulses are applied to its terminal CI.

When the cutter engages the workpiece and the signal U appears momentarily, the flip-flop FF1 will be reset to make the signal TD a binary "0." The engagement signal E will set the flip-flop FF3, thereby making the signal FD a binary "1" and conditioning the servo drive 28 so that it continues the downward drive of the cutter, but at a fed velocity. The engagement signal E also initiates the measurement of the displacement of the cutter 12 as it begins to penetrate the workpiece. As shown in FIG. 1A, the signal E is applied to the set input terminal of the flip-flop FF4, and thus causes the control signal GC to switch to a binary "1" level, thereby opening the gate 81. As the cutter is fed into the workpiece, therefore, each pulse produced on the terminal CT of the direction sensor 38 passes through the gate 81 to the counter input terminal CI. The counter counts each such pulse in an upward sense. Thus, as the depth of the cutter tip progressively increases, the number in the counter increases and dynamically represents that instantaneous depth. For example, if the cutter has penetrated to a depth of 1.345″ below the work surface, the number $a'.b'c'd'$ signaled by the counter will be 1.345. The counter and its associated components thus continuously measure the displacement of the cutter after the latter has initially engaged the work surface.

According to the present method, the downward feeding of the cutter is terminated when its measured displacement equals the predetermined, desired hole depth. And, unless dwelling of the cutter at its point of furthest penetration is desired, the cutter is immediately retracted when such equality occurs. This step in the overall procedure is accomplished by comparing the measured displacement signaled by the counter 80 with the commanded hole depth signaled by the depth command register 76, and terminating the downward feed of the cutter at the instant the compared quantities become equal.

More specifically as shown in FIG. 1A, the output lines of the counter 80 are connected to one set of input terminals 100a of a comparing device 100. The output lines of the register 76 are connected through a first set of gates 101 to a second plurality of input terminals 100b for the device 100. The gates 101 are normally enabled or opened by an $\overline{SS}$ signal which normally resides at a binary "1" level and which is produced by a flip-flop FF5 normally residing in its reset state. The comparing devices 100 may take different forms known to those skilled in the art, and its functions to make its output signal C exist at a binary "1" level only when the two numbers respectively signaled on its input signals 100a and 100b are exactly equal. Thus, the compare signal C will switch from a binary "0" to a binary "1" level when the cutter has drilled a hole equal in depth to the depth command read from the punched tape and stored in the register 76.

The compare signal C is routed to one input of a gate 104 whose second input receives the signal FD which is at a binary "1" level during downward feeding of the cutter. Thus, as soon as the two numbers supplied to the comparing device 100 become equal, the output signal C1 of the gate 104 switches to a binary "1" level, passes to the reset terminal of the flip-flop FF3, and resets the latter. The signal FD reverts to a binary "0" level, and the downard feeding of the cutter is stopped.

Concurrently, the output signal C1 from the gate 104 is applied to the set terminal of a flip-flop FF2, causing the output signal TU of the latter to switch to a binary "1" level. Thus, the servo drive 28 is conditioned to move the cutter, spindle and quill upwardly at a traverse rate. This upward traverse will continue until the quill is moved to a fully retracted position at which it engages and actuates a limit switch LS, causing the latter to produce an upper limit signal UL. The latter signal is routed via a line 105 to one input of an OR circuit 106 whose output signal here designated CY-C will thus change to a binary "1" level, symbolizing that the drilling cycle is complete.

As soon as the "cycle complete" signal CY-C appears, it resets the flip-flop FF2, thereby restoring the signal TU to a binary "0" level and terminating the upward movement of the quill. The cycle complete signal also resets the flip-flop FF4, thereby switching the signal GC to a binary "0" level and restoring the gate 81 to its normally closed position. Moreover, the CY-C signal is applied to the reset terminal of the flip-flop FF5, but this produces no effect since that flip-flop has, as thus far described, resided continuously in its reset state. Finally, the "cycle complete" signal CY-C is applied to the start terminal ST of the tape reader 74 so that the latter begins to read the next block of command data from the punched tape 70.

The sequence of steps described above will now be repeated. The tape reader will read the next block of command information and stop. The positioning servo system 29 will respond to the new position command signals PC and move the workpiece 14 to the newly commanded position beneath the retracted cutter 12. When this positioning is completed, the cutter 12 will be traversed downwardly unil its engagement with the workpiece is signaled by momentary appearance of the upward motion-representing signal U, and in response to this the cutter will be fed downwardly while drilling a hole in the workpiece until its measured displacement from the work surface equals the commanded hole depth stored in the register 76. Thereafter, the cutter will be traversed upwardly and stopped in its fully retracted position when the limit switch LS is actuated. This same sequence will repeat over and over to drill as many holes at desired locations and of desired depths as may be represented by successive blocks on the punched tape.

In these successive "normal" drilling cycles, the cutter 12 is always fully retracted to an upper limit position which is determined by the location of the limit switch LS. The flip-flop FF5 remains always in its reset state, the signal $\overline{SS}$ remains at a binary "1" level, and the gates 101 are always open. Thus, each time that the cutter 12 traverses upwardly after drilling a hole, the pulses U will be produced at the terminal UT of the direction sensor 38. While these pulses U are all transmitted to the reset terminal of the flip-flop FF1, they do not affect the latter since it is already in its reset state during those periods when the cutter is traversing upwardly. Similarly, while the upward motion pulses U appear at one input of the gate 69 when the cutter is traversing upwardly, they do not result in an engagement signal E because the signal TD is at a binary "0" level, and the gate 69 is closed. The pulses U on terminal UT will, however, pass through the gate 95 (FIG. 2) when the spindle begins traversing upwardly, because the sign storage flip-flop FF6 is in its reset state and the signal N+ is at a binary "1" level. Thus, as soon as the spindle begins traversing upwardly after drilling the hole, the flip-flop FF7 will be reset and the signals CU and CD will be switched to binary "0" and "1" levels, respectively.

As the cutter begins traversing upwardly, therefore, the counter 80 will count down in response to pulses which are routed through the open gate 81 to its input terminal CI. The number held in the counter will be progressively reduced, and will in fact be reduced to zero by the time the cutter tip is retracted to the level of the work surface. As a consequence, the zero-representing signal Z will switch momentarily to a binary "1" level, and this accompanied by the pulses U will cause an output signal from the gate 87 (FIG. 2) to set the flip-flop FF6, thereby making the signals N— and N+ switch to binary "1" and "0" levels, respectively. At this instant, one of the U pulses will pass through the gate 91, thereby setting the flip-flop FF7 and making the signal CU change to a binary "1" level. Because of this, the counter 80 will count in an upward sense after the cutter tip has been retracted clear of the work surface and the cutter continues to move in an upward direction. As the number in the counter thus increases, it will pass through a value equal to the hole depth command number held in the register 76 and transferred through the open gates 101 to the comparing device input terminals 100b. In consequence, the comparing device will produce a second compare signal C, but the latter will have no effect because the signal FD is now at a binary "0" level and the gate 104 is closed.

In lieu of employing the pulse signals D and U as first and second signals which exist when the cutter is moving downwardly or upwardly, it would be equally feasible to use the control signals CD and CU. That is, when the cutter is traversing downwardly, the signals CD and CU will respectively reside at binary "1" and "0" levels, and when the cutter strikes and rebounds from the workpiece, the signal CU will momentarily switch to a "1" level This momentary appearance of the signal CU may be detected and utilized as an indication of cutter-work engagement, and may be employed to reset the flip-flop FF1 and to supply an input signal to the gate 69. Of course other and equally effective ways to generate first or second signals when the element is respectively moving in first or second directions will occur to those skilled in the art.

SHORT STROKE OPERATION

The steps of the "normal" drilling cycle will be sufficiently rapid for most applications of the present method. However, in those cases where a great number of successive holes are to be drilled in a work surface which, although varying in elevation, is considerably below the upper limit position of the cutter tip, time is needlessly consumed in retracting the cutter tip all the way up to its upper position, and traversing it downwardly through a considerable distance before it engages the work to start drilling the next hole.

The present method is readily adapted to what may be termed "short stroking" cycles wherein the cutter is retracted free of the workpiece by only a slight, predetermined clearance distance which is just great enough for the workpiece 14 to move horizontally to the next commanded position beneath the cutter tip. When such positioning is complete, the cutter need only be traversed downwardly a very short distance before it again engages the work surface, and the momentary appearance of the "second signal" or the U pulses then converts the cutter motion to a feed rate to begin the drilling of the next hole.

When the "short stroking" operation is desired, this may be commanded by including short stroking command data in any block of the punched tape 70. As any such block is read, command data will be read and stored in the same manner as previously described, but in addition, short stroking command signals SSC will also appear on an output line 75g of the decoder-distributor 75. As a result, an SS code will be supplied to a storage device 110 which will thus produce an output signal SS1 at a binary "1" level to partially enable a gate 111. The short stroke command signals SSC include signals which numerically represent (preferably in binary coded decimal notation) the clearance distance to which the cutter is to be retracted after the next hole is drilled in the workpiece. These number-representing signals are routed via the line 75g to a clearance register 112, stored therein, and represented by the potentials on the output lines thereof.

The clearance distance storage register 112 is similar to the register 76, and need not be described in detail. It should be observed, however, that the output lines of the register 112 lead to the inputs of a plurality of gates 114 whose outputs connect to the terminals 100b. The gates 114 are all controlled by a signal SS supplied thereto from the flip-flop FF5 and which is normally at a binary "0" level. When the flip-flop FF5 is set, however, to make the signal SS reside at a binary "1" level, then the clearance number held in the register 112 will be applied to the input terminals 100b of the comparing devices 100.

With the foregoing in mind, the sequential steps of the "short stroking" operation cycle may be understood. Let it be assumed that after a given block of command information has been read from the punched tape 70, the depth command register 76 stores the number 3.265, indicating that the next hole to be drilled must be 3.265" deep. Let it be assumed further, that the SS code storage device 110 is now producing a signal SS1 at a binary "1" level, and that the clearance distance register stores a clearance number of 0.250, indicating that after the hole has been drilled, the cutter tip is to be retracted only to a distance of 0.250" above the work surface.

After this block of data has been read from the punched tape, and the positioning servo system 29 has properly positioned the workpiece 14 in accordance with the positioning command signals PC, the "in position" signal IP will switch to a binary "1" level, thereby setting the flip-flop FF1 and making the signal TD switch to a binary "1" level. As a result, the differentiator 82 will supply a signal to the reset terminal of the counter 80 and the latter will be driven to its zero state. Moreover, the signal TD will condition the traverse and feed servo drive 28 so that the cutter 12 is traversed downwardly from its upper limit position.

As the cutter is traversing downwardly, the pulses D will appear on the output terminal DT of the direction sensor 38, so that the signals N+ and CU will reside at binary "1" levels. However, the gate 81 is at this time closed, so that the counter 80 does not respond to pulses which appear on the count terminal CT.

When the counter strikes and rebounds slightly from the workpiece 14, the signal U will appear momentarily to reset the flip-flop FF1 and will pass through the gate 69 to produce an engagement signal E which in turn sets the flip-flops FF3 and FF4. As a result, the signal FD switches to a binary "1" level and the cutter is now driven downwardly at a feed rate. Moreover, the gate 81 is opened so that pulses from the direction sensor are counted in the counter 80 as the cutter 12 is moved into the workpiece to drill the hole.

When the cutter has drilled the hole to the commanded depth of 3.265", the number 3.265 will be signaled both by the counter 80 and the depth command register 76. Because the flip-flop FF5 is in its reset state and the signal SS is at a binary "1" level, the gates 101 are open, and the output signals from the registers 76 appear on the input terminals 100b. Thus, when the hole has been drilled to the commanded depth, the output signal C from the comparing device will switch to a binary "1" level, pass through the enabled gate 104 to appear as a C1 signal which resets the flip-flop FF3 and sets the flip-flop FF2. The signals FD and TU thus change to binary "0" and "1" levels, respectively, so that the cutter 12 begins traversing upwardly out of the hole which has just been drilled.

The signal C1 at the output of the gate 104 and which changes to a binary "1" level when the cutter reaches the commanded depth is also routed as one input to the gate 111 which is enabled by the signal SS1 from the storage device 110. The resulting output of the gate 111 sets the flip-flop FF5, thereby switching the signals $\overline{SS}$ and SS to binary "0" and "1" levels, respectively. In consequence, the several gates 101 are closed, and the gates 114 are opened, so that the input terminals 100b of the comparing device 100 now receive signals from the clearance register 112 representing the commanded clearance distance.

In the short stroking cycles, after the hole has been drilled to the commanded depth, the cutter is traversed upwardly through a displacement which is the sum of the hole depth and the commanded clearance distance.

As the cutter traverses upwardly, pulses U will be created in the direction sensor 38, and since the sign signal N+ is at a binary "1" level, the flip-flop FF7 (FIG. 2) will be reset so that the counter control signal CD changes to a binary "1." Therefore, as the cutter is being withdrawn from the drilled hole, the counter 80 will count in a downward direction and the number signaled thereby will be progressively reduced. At the instant that the cutter tip is retracted to the level of the work surface, the number held in the counter 80 will be reduced to zero, and the Z signal from the decoder 84 will switch to a binary "1" level. Because the cutter is still moving in an upward direction, and the pulses U are still being generated, the gate 87 (FIG. 2) will produce an output signal to set the sign flip-flop FF6, making the signals N— and N+ switch to binary "1" and "0" levels, respectively. In consequence, the gate 91 will pass a signal through the OR circuit 90 to set the flip-flop FF7 making the signal CU switch to a binary "1" level. Therefore, as the cutter 12 continues to move upwardly after its tip has cleared the work surface, the counter 80 will count in an upward sense in response to pulses appearing on the direction sensor terminal CT and passed through the still-open gate 81.

The signal N— is now at a binary "1" level, designating that the number held in the counter 80 has a negative sign, and indicating that the cutter tip is displaced upwardly from the work surface. As the cutter continues to move upwardly and away from the work surface, the number in the counter 80 will be increased and will approach the value of the clearance distance number (e.g., 0.250) held in the storage register 112 and applied through the now-open gates 114 to the comparing device input terminals 100b. Accordingly, when the cutter tip has been retracted free of the work surface by a distance (0.250") equal to the commanded clearance, the comparing device 100 will produce another output signal C. That signal produces no response from the gate 104 which is now closed because its second input signal FD is at a binary "0" level. But the second compare signal is routed to one input of a previously disabled gate 116. This latter gate receives as a second input the signal SS from the flip-flop FF5, such signal now residing at a binary "1" level. The gate 116 also receives as an input the sign-representing signal N— which now resides at a binary "1" level. Also, the gate 116 receives as a fourth input the signal TU which is at a binary "1" level because the spindle is being traversed upwardly. Accordingly, when the second response is produced by the comparing device 100, the gate 116 produces an output signal C2 which passes through the OR circuit 106 to make the cycle complete signal CY-C switch to a binary "1" level. This happens when the cutter tip has been retracted clear of the work by a distance (0.250") equal to the commanded clearance distance stored in the register 112.

When the "cycle complete" signal CY-C appears, it causes resetting of the flip-flops FF2 and FF4, and thus the upward movement of the cutter is terminated and the gate 81 is reclosed. The cycle complete signal CY-C also resets the flip-flop FF5, and appears at the start terminal ST of the tape reader 74 so that the latter begins to read the next block of information.

In this manner, the cutter 12 is retracted only a slight, commanded clearance distance above the workpiece and then stopped. The tape reader is restarted to read the next block of information from the punched tape, and the workpiece will be repositioned beneath the cutter. When this next positioning operation has been completed, and the "in position" signal IP appears, the flip-flop FF1 will be set to make the signal TD a binary "1" (and also to reset the counter 80), so that a new cycle of operation is started with the cutter being traversed downwardly toward the work surface. The cutter need only move through the small clearance distance before it will engage and rebound slightly from the workpiece, causing momentary appearance of the signal U, and the response to such momentary appearance which has been described before.

Viewed in a different way, the short stroking method is similar to the "normal" cycle, but after the hole has been drilled to the commanded depth, and the cutter is being retracted, the displacement of the cutter is measured until its withdrawal becomes equal to the hole depth (and the counter number is reduced to zero by downward counting). Then a second displacement measurement is begun as the cutter continues to retract, by causing the counter to count upwardly, and the upward motion of the cutter is stopped when the second measurement indicates that the actual clearance of the cutter above the work surface is equal to the desired, commanded clearance. This equality is signaled in the arrangement here shown by the second compare signal which passes through the gate 116.

It will now be understood that the method here described brings to the art a very simple and reliable manner for controlling the cycling of a movable element such as a drilling cutter, and wherein the engagement of the element with an obstacle such as a workpiece is almost instantaneously signaled so as to convert the motion velocity from a high to a low value while initiating measurement of the subsequent displacement. The method here described is suited not only to producing normal cycles wherein the movable element or cutter is fully retracted atfer each penetration into the workpiece, but also to short stroking cycles wherein the cutter is withdrawn only to small predetermined clearance distances above the workpiece surface after each penetration.

I claim as my invention:

1. The method of substantially instantaneously signaling when an element movable in first or second directions engages an obstacle while traveling in a first direction, comprising generating an electrical signal whenever the element is moving in second direction, and detecting the very short appearance of said signal which results from the momentary rebounding of the element when it strikes the obstacle.

2. The method of indicating when a movable element is moving in first or second directions and of substantially instantaneously signaling when the element engages an obstacle while traveling in said first direction, comprising generating first or second electrical signals when the element is moving in said first or second directions, respectively, and producing an engagement-indicating signal at the instant that the first signal disappears and the second signal appears.

3. The method of indicating the direction of movement of a movable element and of substantially instantaneously signaling when the element engages an obstacle while moving in a given direction, comprising generating first and second electrical signals when the element is moving in said given direction or the direction opposite thereto, respectively, sensing the momentary appearance of said second signal as a result of the element striking an obstacle and rebounding at least slightly, and utilizing such momentary appearance of said second signal as an engagement-indicating signal.

4. The method of signaling when a movable element selectively drivable in opposite directions engages an obstacle, while also measuring and signaling its displacement under certain conditions, such method comprising generating a pulse for each basic increment of movement executed by the element, producing first and second control signals when said element is moving in first or second directions, respectively, counting said pulses in a positive or negative sense when said first or second signals respectively exist and the displacement of the element is to be measured, and creating an engagement-indicating signal in response to the momentary appearance of said second signal when the element is being driven in said first direction, such momentary appearance resulting from the element striking and slightly rebounding from an obstacle.

5. The method of feeding a metal cutting element a predetermined distance after its engagement with a workpiece, comprising moving said element in a first direction toward said workpiece, generating first or second signals when said element is moving in said first direction or in a second direction opposite thereto, detecting the momentary appearance of said signal which results from the element striking the workpiece and rebounding at least slightly therefrom, and, in response to such detection, continuing the movement of the element in said first direction and measuring and signaling its displacement with the use of said first signal, and stopping such movement when the measured displacement becomes equal to the desired predetermined distance.

6. The method for feeding a drilling cutter or the like relative to a workpiece to machine the latter to a predetermined depth, comprising generating first or second signals when the cutter is moving in first or second directions, respectively, toward or away from the workpiece, traversing said cutter toward the workpiece, detecting the momentary appearance of said second signal resulting from the cutter striking the workpiece and rebounding at least slightly therefrom, and, after such detection, immediately continuing movement of the cutter in said direction while signaling and measuring its displacement with the use of said first signal, comparing the measured displacement with the desired predetermined depth, and stopping feeding movement of the cutter when the two compared quantities become equal.

7. The method of short stroking a drilling cutter or the like to machine holes in a workpiece, comprising generating first or second electrical signals when the drilling cutter is moving in first or second directions, respectively, toward or away from the workpiece, moving the cutter in said first direction while it is free of the workpiece, detecting the momentary appearance of said second signal which results from the cutter engaging and at least slightly rebounding from the surface of the workpiece, measuring the displacement of said cutter with the use of said first signal after such detection occurs and continuing the movement of the cutter in said first direction, moving the cutter in said second direction after such measured displacement becomes equal to the desired hole depth, measuring the displacement of the cutter with the use of said second signal as it moves in said second direction, and stopping the movement of the cutter when the second measured displacement equals the sum of the first measured displacement and a predetermined clearance distance, whereupon the cycle may be repeated.

8. The method set forth in claim 7 further characterized in that the movement of the cutter in the first direction while free of the workpiece is at a traverse velocity, the continuing movement of the cutter after the said detection is at a feed velocity, and the movement of the cutter in said second direction is at a traverse velocity.

9. The method set forth in claim 7 further characterized in that the two last-recited steps include measuring the displacement of the cutter as it moves in said second direction until such displacement equals the first measured displacement, and thereafter beginning a new displacement measurement as the cutter continues to move in said second direction, and stopping the movement of the cutter when the new displacement equals a predetermined clearance distance.

10. In a system having a cutter relatively movable toward or away from a workpiece, the combination comprising means for initiating and continuing movement of said cutter toward said workpiece at a traverse velocity, means for producing first or second electric signals whenever said cutter is respectively moving toward or away from the workpiece, means responsive to the momentary appearance of said second signal while said first means are operative for (a) disabling said first means and (b) continuing movement of the cutter in the same direction but at a feed velocity.

11. In a system for moving a reciprocatable drilling cutter or the like into a workpiece for drilling successive holes of predetermined depths, the combination comprising first means for initiating and continuing movement of the cutter toward the workpiece, second means for producing first or second signals whenever the cutter is respectively moving toward or away from the workpiece, third selectively enabled means for measuring and signaling the displacement of the cutter from selectable starting point, fourth means responsive to the momentary appearance of said second signal while said first means are operative for enabling said third means so that the latter signals the displacement of the cutter from the point at which the latter first touches the workpiece, and fifth means responsive to the signaled displacement becoming equal to a desired hole depth for initiating and continuing movement of the cutter away from the workpiece until it reaches a predetermined, retracted position.

12. In a system which includes a movable element and means for selectively driving it in positive or negative directions, the combination comprising a reversible counter, means coupled to said element for producing a pulse in response to movement of the element through each basic distance increment, means coupled to said element for producing first or second signals when the element is respectively moving in positive or negative directions; means responsive to said first or second signals for causing said counter to count said pulses in an up or down sense so that the number stored in the counter is representative of the element's displacement from a datum point; means responsive to momentary appearance of one of said signals, when the element is being driven in a direction opposite to the direction which corresponds to such signal, for producing an engagement signal indicating that the element has struck and rebounded from an obstacle in its path; and means responsive to said engagement signal for modifying the drive of the element.

13. The method of converting the motion of a movable cutter from a traverse velocity to a feed velocity for efficient machining of a workpiece, comprising moving the cutter in a first direction toward the workpiece at a traverse velocity, generating an electrical signal whenever the cutter is moving in a second direction away from the workpiece, detecting the momentary appearance of said signal which results when the cutter engages the workpiece and rebounds away at least slightly therefrom, and immediately after such detection moving the cutter at a feed velocity toward and into the workpiece.

References Cited

UNITED STATES PATENTS

| | | | |
|---|---|---|---|
| 3,302,492 | 2/1967 | Weidig | 77—32.1 |
| 3,021,464 | 2/1962 | Philip | 318—20.320 |

FRANCIS S. HUSAR, Primary Examiner

U.S. Cl. X.R.

318—162